Feb. 23, 1926.　　　　　　　　　　　　　　　　　1,574,766
J. W. SMITH ET AL
AUTOMATIC WEIGHING MACHINE
Filed Nov. 21, 1924　　　2 Sheets-Sheet 1
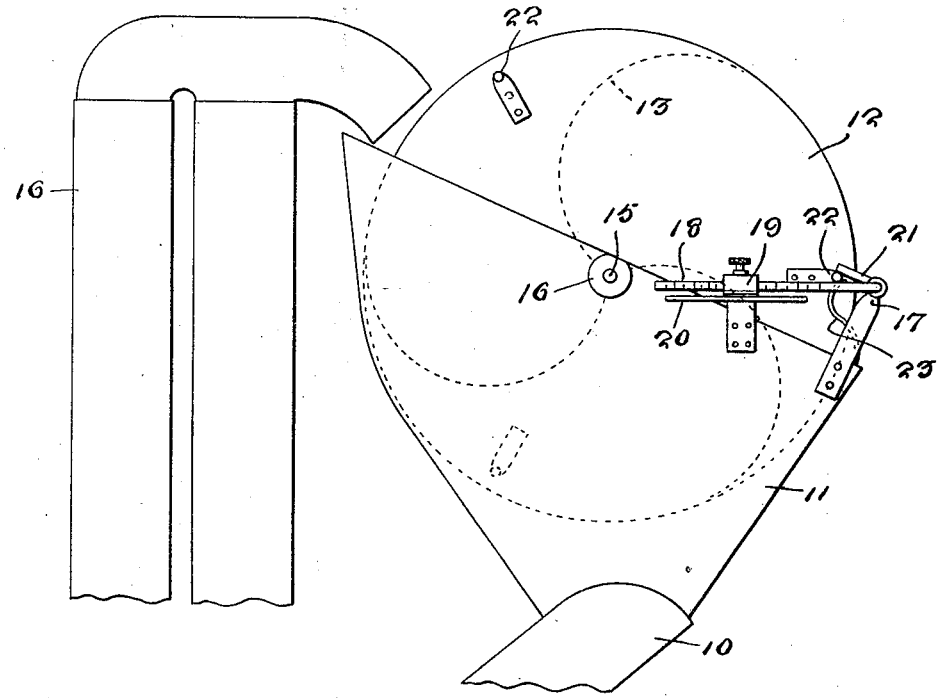
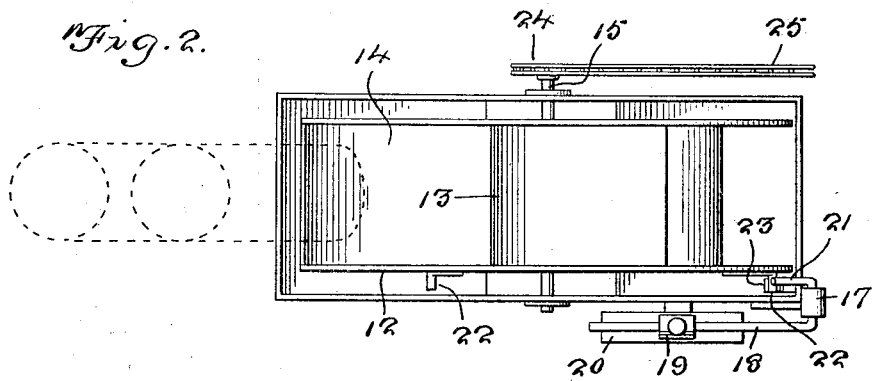
J. W. Smith
S. W. Smith
E. S. Smith
INVENTOR
BY Victor J. Evans
ATTORNEY
WITNESS:

Feb. 23, 1926.  1,574,706
J. W. SMITH ET AL
AUTOMATIC WEIGHING MACHINE
Filed Nov. 21, 1924   2 Sheets-Sheet 2

J. W. Smith
S. W. Smith
E. S. Smith
INVENTOR

BY Victor J. Evans
ATTORNEY

WITNESS:

Patented Feb. 23, 1926.

1,574,706

UNITED STATES PATENT OFFICE.

JOSHUA W. SMITH, SHELDON W. SMITH, AND EDMUND S. SMITH, OF SPRINGVILLE, IOWA.

AUTOMATIC WEIGHING MACHINE.

Application filed November 21, 1924. Serial No. 751,352.

*To all whom it may concern:*

Be it known that we, JOSHUA W. SMITH, SHELDON W. SMITH, and EDMUND S. SMITH, citizens of the United States, residing at Springville, in the county of Linn and State of Iowa, have invented new and useful Improvements in Automatic Weighing Machines, of which the following is a specification.

This invention relates to machines for weighing grain and the like and is especially adapted for use upon threshing machines.

An object of the present invention is to provide a weighing machine of this character which is simple in construction, reliable and smooth in operation and by means of which grain, cereals and other like commodities may be expeditiously weighed in large quantities.

With the above and other objects in view, the invention further includes the following novel features and details of construction, to be hereinafter more fully described, illustrated in the accompanying drawings and pointed out in the appended claims.

In the drawings:—

Figure 1 is a fragmentary side elevation illustrating the invention.

Figure 2 is a top plan view showing the elevator of the threshing machine by dotted lines.

Figure 3:
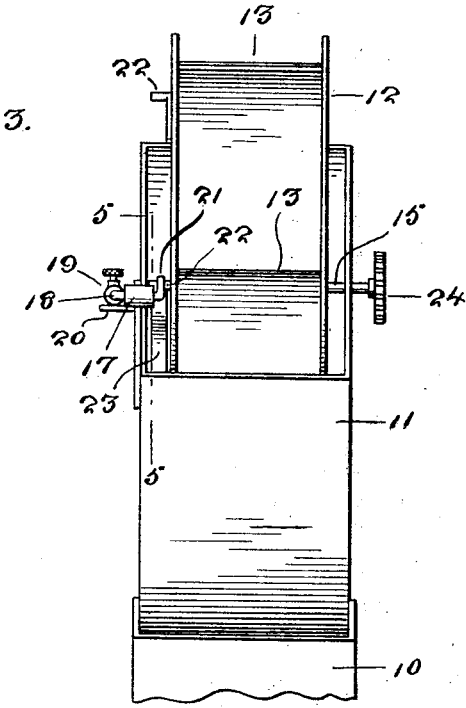
Figure 3 is an edge view of the weighing machine.

Referring to the drawings in detail wherein like characters of reference denote corresponding parts, the reference character 10 indicates a portion of the conveyor of a threshing machine upon the end of which is mounted a hopper 11. This hopper provides a support for a rotor 12 in which the grain is adapted to be measured, and in addition, directs the grain into a conveyor.

Figure 4:
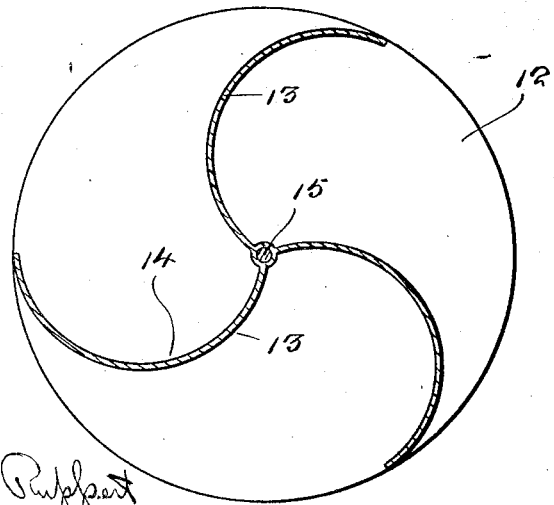
Figure 4 is a detail sectional view of the rotatable member taken transversely of its axis.
Figure 5:
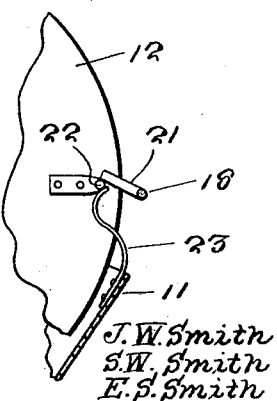
Figure 5 is a fragmentary sectional view illustrating the combined holding and retarding means for the rotatable member.

The rotor 12 comprises spaced parallel plates and partitions 13 which connect the plates. These partitions are shaped as shown in Figure 4 of the drawings so as to provide pockets 14 into which the grain may be directed, the weight of the grain operating the rotor 12 so that the pockets will discharge into the hopper. The rotor is mounted upon a transverse shaft 15 which operates in bearings 16 supported in the hopper 11. Grain is fed to the pockets 14 by any suitable means such as the elevator E of a threshing machine.

Pivotally mounted within a bracket 17 secured to the hopper 11 is a scale beam 18 and adjustable upon this beam is a poise 19. A platform 20 which is secured to the hopper 11 and which extends horizontally beneath the beam 18 provides a rest for the poise and limits pivotal movement of the beam in one direction. The platform extends for an appreciable distance beneath the beam so as to provide for proper range of adjustment of the poise. Spaced from the beam 18 and rigid with one end of the latter is an arm 21. This arm is adapted to be engaged by any one of a number of stops 22 which extend from one side of the rotor 12, one of these stops being provided for each of the pockets 14. When one of the stops engages the arm 21 one of the pockets will be in position to receive grain from the elevator 16 and when a sufficient quantity of grain has been received within this pocket, weight of the poise will be overcome and the rotor will rotate to discharge the contents of the pocket into the hopper. The next succeeding stop 22 will engage the arm 21, the beam having resumed its normal position.

In order to prevent a sudden stop or jar when the stops 22 engage the arm 21 and obviate possibility of momentum carrying the stop by said arm, means are provided for retarding movement of the rotor prior to the stops engaging the arm. This means consists of a spring arm 23 which is located in the path of the stops 22. This arm 23 is so tensioned as to retard movement of the rotor 12, but permits sufficient movement to allow the stop 22 to pass beyond the end of the arm until it engages the arm 21. The arm 23 will then move inward and its outer extremity is curved so as to rest beneath the stop 22 and prevent retrograde movement of the rotor.

Suitable means may be provided for operatively connecting the machine to a register. Such means may consist of mounting a sprocket wheel 24 upon the shaft 15 and connecting it with a register (not shown) by means of a chain 25.

The invention is susceptible of various changes in its form, proportions and minor details of construction and the right is herein reserved to make such changes as properly fall within the scope of the appended claims.

Having described the invention what is claimed is:—

1. An automatic weighing machine comprising a hopper, a member mounted for rotation therein, a plurality of pockets provided in said member, means whereby the material to be weighed may be fed to the pockets and the member rotated by the weight of the material, a stop extending from the rotatably mounted member, a scale beam pivotally mounted upon the hopper, an arm carried by the beam and disposed in the path of the stops whereby movement of the member may be stopped and the pockets properly positioned, a support located in the path of the beam for limiting its movement in one direction and means located in the path of the stops for retarding movement of the member before each of the stops engage the arm and for holding said member against retrograde rotation.

2. An automatic weighing machine comprising a hopper, a member mounted for rotation therein, a plurality of pockets provided in said member, means whereby the material to be weighed may be fed to the pockets and the member rotated by the weight of the material, a stop extending from the rotatably mounted member, a pivotally mounted scale beam, an arm rigid with and spaced from one end of the beam and located in the path of the stops whereby movement of the member may be stopped and the pockets properly positioned, a support located in the path of the beam for limiting its movement in one direction and means for retarding movement of the member before each of the stops engage the arm.

3. An automatic weighing machine comprising a hopper, a member mounted for rotation therein, a plurality of pockets provided in said member, means whereby the material to be weighed may be fed to the pockets and the member rotated by the weight of the material, a stop extending through the rotatably mounted member, a scale beam pivotally mounted upon the hopper, an arm carried by the beam and disposed in the path of the stops whereby movement of the member may be stopped and the pockets properly positioned, a poise adjustable upon the arm and a horizontally disposed platform located in the path of the beam and engaged by the poise to support the latter and limit movement of the beam in one direction.

In testimony whereof we affix our signatures.

JOSHUA W. SMITH.
SHELDON W. SMITH.
EDMUND S. SMITH.